US008868609B2

(12) United States Patent
Chen et al.

(10) Patent No.: US 8,868,609 B2
(45) Date of Patent: Oct. 21, 2014

(54) TAGGING METHOD AND APPARATUS BASED ON STRUCTURED DATA SET

(75) Inventors: Jian Chen, Beijing (CN); Ben Fei, Beijing (CN); Rui Ma, Beijing (CN); Zhong Su, Beijing (CN); Xian Wu, Xuzhou (CN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 12/860,112

(22) Filed: Aug. 20, 2010

(65) Prior Publication Data

US 2011/0078206 A1    Mar. 31, 2011

(30) Foreign Application Priority Data

Sep. 29, 2009    (CN) ........................ 2009 1 0177315

(51) Int. Cl.
    *G06F 17/30*    (2006.01)
(52) U.S. Cl.
    CPC ..................................... *G06F 17/30* (2013.01)
    USPC ........................................ 707/791; 707/802
(58) Field of Classification Search
    USPC .................................................. 707/791, 802
    See application file for complete search history.

(56) References Cited

U.S. PATENT DOCUMENTS

| 5,018,075 | A  | * | 5/1991 | Ryan et al. ....................... 706/46 |
| 6,709,330 | B1 | * | 3/2004 | Klein et al. ....................... 463/9 |
| 2005/0125216 | A1 | * | 6/2005 | Chitrapura et al. ............... 704/1 |
| 2005/0278633 | A1 | * | 12/2005 | Kemp ........................... 715/713 |
| 2007/0203945 | A1 |   | 8/2007 | Louw |
| 2007/0294281 | A1 |   | 12/2007 | Ward et al. |
| 2008/0021976 | A1 |   | 1/2008 | Chen et al. |
| 2009/0048823 | A1 | * | 2/2009 | Liu et al. ........................... 704/9 |
| 2009/0048927 | A1 | * | 2/2009 | Gross ............................. 705/14 |
| 2009/0049018 | A1 |   | 2/2009 | Gross |
| 2009/0049037 | A1 |   | 2/2009 | Gross |
| 2009/0055359 | A1 |   | 2/2009 | Gross |
| 2009/0063469 | A1 |   | 3/2009 | Gross |
| 2009/0112892 | A1 | * | 4/2009 | Cardie et al. .................. 707/100 |
| 2010/0153372 | A1 | * | 6/2010 | Kim ............................. 707/722 |

OTHER PUBLICATIONS

Pang, Bo et al; "Thumbs up? Sentiment Classification using Machine Learning Techniques"; Proceedings of the Conference on Empirical Methods in Natural Language Processing (EMNLP); Association for Computational Linguistics. Philadelphia, Jul. 2002, pp. 79-86.

Dave, Kushal et al. "Mining the Peanut Gallery: Opinion Extraction and Semantic Classification of Product Reviews." Proceeding WWW '03, Proceedings of the 12th International Conference on World Wide Web. Budapest, Hungary; May 20-24, 2003.

Yu, Bei et al. "Exploring the Characteristics of Opinion Expressions for Political Opinion Classification." The Proceedings of the 9th Annual International Digital Government Research Conference. Montreal, Canada; May 18-21, 2008; pp. 82-91.

* cited by examiner

*Primary Examiner* — Son T Hoang
(74) *Attorney, Agent, or Firm* — Mollborn Patents, Inc.; Fredrik Mollborn

(57) ABSTRACT

Tagging methods and apparatus, including computer program products, based on a structured data set. Classification models are created for respective nodes in the structured data set of an event. Public opinions on the event are acquired. The opinions are tagged to corresponding nodes of the structured data set using the created classification models. The tagging methods and apparatus provide well-ordered, focused public opinions for each event to users, and exhibit the evolution of the public opinions along with time.

14 Claims, 8 Drawing Sheets

TAGGING METHOD AND APPARATUS BASED ON STRUCTURED DATA SET

BACKGROUND

The present disclosure relates to a tagging method and apparatus based on structured data set. These days, users often share their ideas, opinions and experiences in a variety of topics including politics, finance, social life, education, entertainment, etc. over the Internet. Thus, there is an overwhelming growth of the massive data generated by on-line users. Whenever a news report concerned with an event comes out, despite of the official report or announcements, people are inclined to pay attention to the specific details of the public opinions on the event, as well as the evolution of the public opinions over time.

Opinion mining techniques have been investigated over the past decades. It extracts the opinion sentences from the user-generated contents, such as blogs, wikis and forums. Aided by such technique, many users' opinions and views regarding any pieces of news events can be collected.

However, what is collected by such technique is a cluster of un-organized, simply listed-out public opinion sentences, which are not convenient enough for use.

SUMMARY

In one aspect of the present disclosure, methods and apparatus, including computer program products, are provided for performing a tagging method based on a structured data set. Classification models are created for respective nodes in the structured data set of an event. Public opinions on the event are created. The public opinions are tagged to corresponding nodes of the structured data set using the created classification models.

Various embodiments can include one or more of the following features. Creating classification models for the respective nodes in the structured data set can include: selecting feature information from a current node and its subordinate level nodes of the structured data set; and generating a classification model for the current node in accordance with the feature information. Similarities can be compared between the public opinions and the respective nodes of the structured data set and the public opinions having the greatest similarity can be tagged a nodes. Comparing similarities between the public opinions and the respective nodes of the structured data set can include extracting the feature information of a public opinion, inputting the feature information of the public opinion into the classification model of a current node, and outputting a classification result which exhibits the similarity between the public opinion and the current node in form of numerical value. The feature information can include at least one of: content feature, time feature and sentiment feature. Comparing similarities between the public opinions and the respective nodes of the structured data set can further include: recording the current node, and rewriting a predetermined threshold to the value of the similarity, if the similarity is larger than the predetermined threshold, and continuing to compare the similarity between the public opinion and the subordinate level nodes of the current node, if the current node has subordinate level nodes.

Comparing similarities between the public opinions and the respective nodes of the structured data set can further include tagging the public opinion to the node having the greatest similarity, if the similarity of the current node is not larger than the predetermined threshold or the current node has no subordinate level node. Comparing similarities between the public opinions and the respective nodes of the structured data set can further include comparing several subordinate level nodes with the public opinion, and setting the node having the greatest similarity as a new current node, if the current node has the plurality of subordinate level nodes. The current node can be a root node of the structured data set. The structured data set can be a tree-like data set.

BRIEF DESCRIPTION OF THE DRAWINGS

From the detailed description of the embodiments of the present disclosure in combination with the attached drawings below, these and/or other aspects and advantages of the disclosure will become more distinct and easier to be understood, wherein.

DETAILED DESCRIPTION

Figure 1:
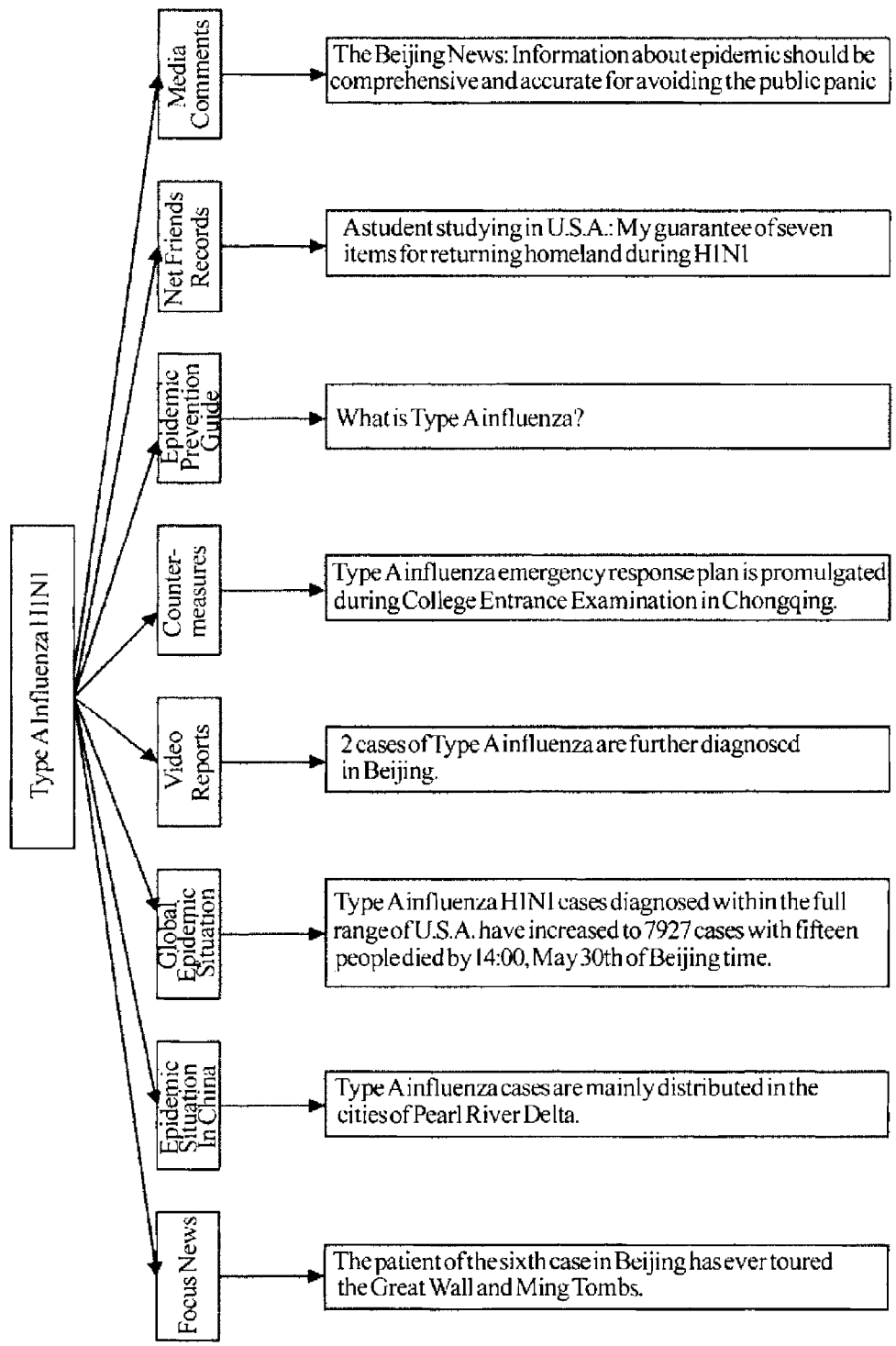
FIG. 1 is a view showing a created structured data set in accordance with one embodiment.

The disclosure brings forward a tracking tagging method and apparatus capable of tagging the public opinions on the Internet or other non-network media to the corresponding nodes of the event tree formed in accordance with reports for a particular event. The various tracking tagging methods and apparatus according to the present disclosure can provide well-ordered, focused public opinions for each event to the users, and exhibit the evolution of the public opinions along with time.

In the following, in combination with the attached drawings, specific embodiments of the present disclosure will be described in detail. In the event that a detailed description of some related subject matter might confuse the key points of the disclosure, such a detailed description will not be provided here. In the various embodiments, identical reference numerals are used to represent identical elements or units performing identical functions.

Internet users browse the contents of the Internet by displaying different web pages on the screens of various electronic devices such as a computer, a portable computer, a mobile phone, a PDA (Personal Digital Assistant), etc. There are various contents contained in the web pages. For example, the official reports for "Type A influenza H1N1" by the network media such as Fenghuang Net (凤凰网), Hexun Net (和讯网), and Sina Net (新浪网) can be displayed in the web pages. Various subtitles for the topic on "Type A influenza H1N1" are contained in the displayed official reports, and all sorts of report news in various forms such as text, picture, video, audio, and so on can be contained under respective subtitles.

In addition, various reports for news events in the above forms can still be found in some print media such as newspapers, magazines, etc.

According to an aspect of the present disclosure, a structured data set can be created for the events reported by the above respective media.

FIG. 1 is a view showing a created structured data set in accordance with one embodiment.

In FIG. 1, the created structured data set is illustrated as an event tree having a tree-like structure. The event tree can be considered as a data set. The respective nodes in the event tree represent different aspects of the same reported event. For example, the root node of the event tree (first level node) is "Type A influenza H1N1", and keywords selected by the root node are "Type A", "H1N1", "Influenza", etc. Middle nodes (second level nodes) of the event tree are for example "Focus news", "epidemic situations in China", "Global epidemic situations", "Video reports", "Countermeasures", "Epidemic prevention guide", "Net friends records", "Media comments", etc. Under each second level node, several further subordinate level nodes (for example, third level nodes here) are further branched out so as to contain news with more details of the event. The terminal nodes are referred to as leaf nodes, and the nodes of respective levels between the root node and the terminal nodes are referred to as middle nodes.

Figure 2:
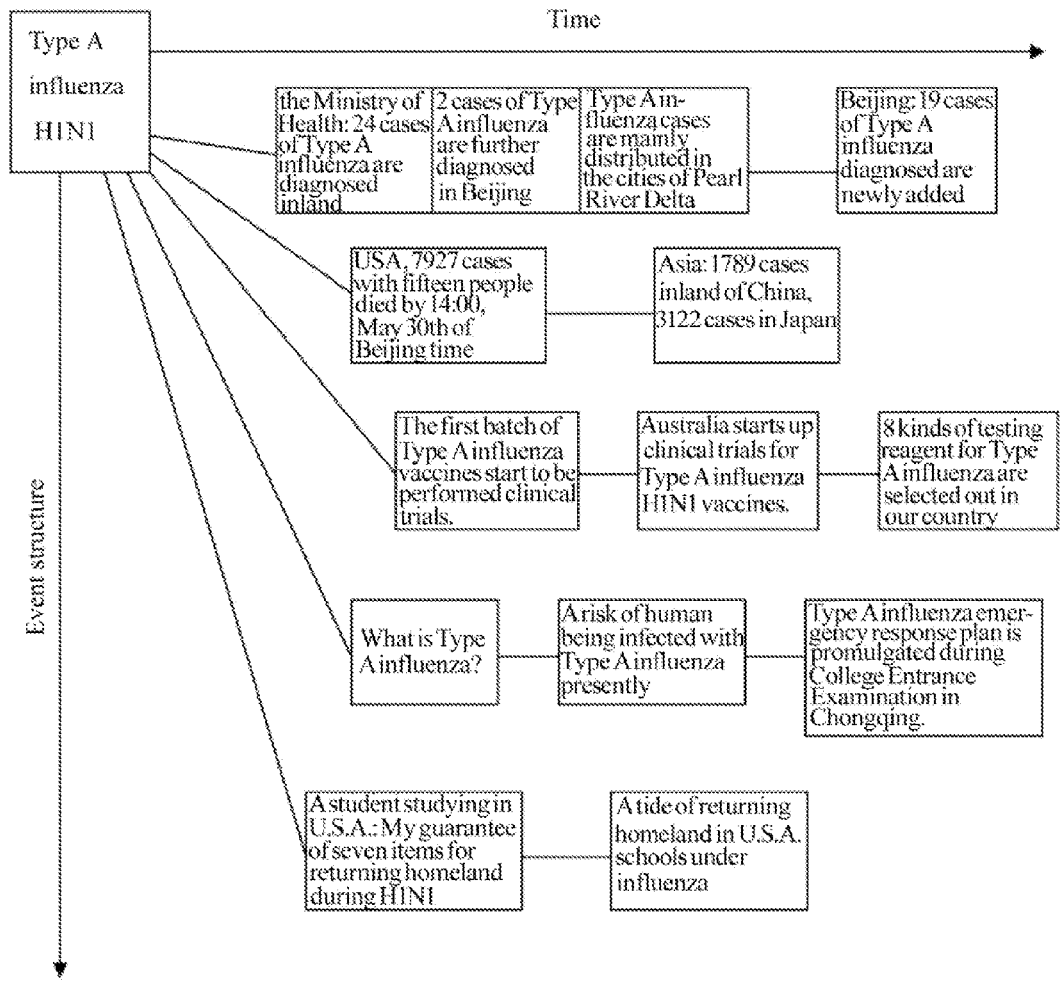
FIG. 2 is a view showing a created structured data set containing time factor in accordance with one embodiment.

FIG. 2 is a view showing a created structured data set containing time factor.

In FIG. 2, the horizontal axis indicates time, and the vertical axis indicates event classification. Several second level nodes with each containing several third level nodes are branched out from the root node "Type A influenza H1N1". The third level nodes are arranged in time order, for example, the third level nodes such as "Ministry of Health: 24 cases of Type A influenza H1N1 are diagnosed inland", "2 cases of Type A influenza H1N1 are further diagnosed in Beijing", "Type A influenza H1N1 cases are mainly distributed in the cities of the Pearl River Delta", etc. are further contained in the second level node "Video reports" (see FIG. 1) according to time order.

The method for creating an event tree for official reports issued by the network media regarding a particular event can be that, for example, news web pages for reporting the particular event by news websites of the network media are analyzed by using keywords, thus an event tree for official reports is obtained. More particularly, the process for creating the event tree from a root node to leaf nodes can be performed in a coarse-to-fine manner. The root node contains the most comprehensive keywords so as to search for all the relevant reports regarding the particular event, wherein the used keywords can be selected from the titles and subtitles for reporting a certain event, for example. According to aforementioned embodiment, the keywords of the root node can be selected as "Type A", "H1N1", and "Influenza". The middle nodes and leaf nodes emphasize one or a few aspects of the event which can be official reports for a particular event etc. with more detailed news contained therein. The keywords used by the middle nodes and the leaf nodes discriminate from those by the root node. For example, according to the aforementioned embodiment, the above keywords for the root node are not be used anymore in the keywords of the middle nodes and the leaf nodes.

According to an embodiment of the present disclosure, the process for creating an event tree for official reports for a particular event can be for example as follows. First, searching relevant web pages for the official reports for the certain event reported by the network media by using the most comprehensive keywords, including headline news and official comments and so on, thereby creating the root node of the event tree, which contains the most comprehensive reports issued by the media (official) regarding the event. Second, within the range of all the searched report news, doing a search by means of the keywords which reflect one or a few aspects of the event and classifying all the searched report news into several classes so as to create the middle nodes of respective levels. Finally, doing search within the range of the already classified report news of the respective levels by using the keywords reflecting the respective details of the event so as to create the respective leaf nodes.

This method for creating an event tree does not limit the scope of the disclosure. For data from non-network media, such as historical reports for a certain topic in newspapers, archives, etc., the data structure itself does generally not have an explicit extractable structure feature. Instead other ways, such as a hierarchical clustering method, are needed to create the structured event tree. The hierarchical clustering method involves grouping the data into a clustering tree from bottom to top (from the leaf nodes to the root node) by using the features such as time, text etc. for the data to obtain a data set of tree-like structure.

The data set of tree-like structure (event tree) does not limit the scope of the disclosure either. Instead, the structured data set of the disclosure may be represented by forms other than the tree-like structure, for example, the respective nodes of the data set may be of either a planar mesh structure or a three-dimensional mesh structure, and so on.

For various event news reported by various media, the public may come out with the public opinions through all kinds of platforms such as either blogs, forums, Wilds, etc. or non-network media. According to one aspect of the disclosure, the public opinion data regarding the reported event may be obtained by doing search on the relevant web pages by using the keywords used when creating an event-based structured data set (event tree) or analyzing the contents of the non-network media. The techniques for obtaining opinions delivered by the public may be techniques well known by those skilled in the art, which do not limit the scope of the disclosure.

Figure 3:
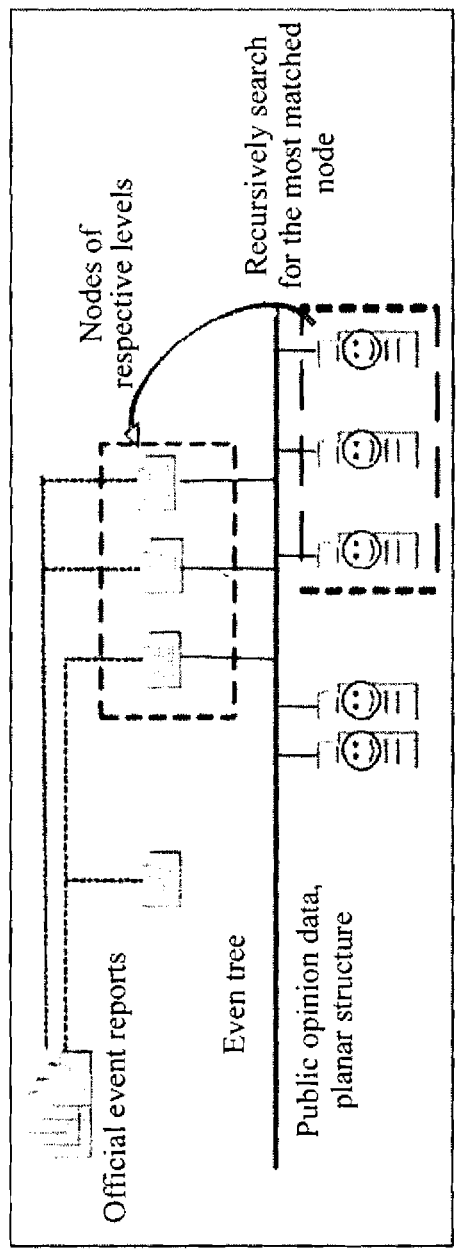
FIG. 3 is a diagram showing a created event tree for official reports and searched public opinion data in accordance with one embodiment.

FIG. 3 is a diagram showing a created event tree and the searched public opinion data in accordance with one embodiment.

In FIG. 3, the upper part shows the created event tree with the root node and the respective lower level nodes (which may be the nodes of several levels) of the root node contained therein, and the lower part shows a planar structure for the searched public opinion data.

According to an aspect of the disclosure, a tracking tagging method and apparatus for tagging the searched public opinion data to the corresponding nodes of a event tree is provided, wherein a method of recursive matching is used to search for the best matched node in the event tree for the public opinion data.

Figure 4:
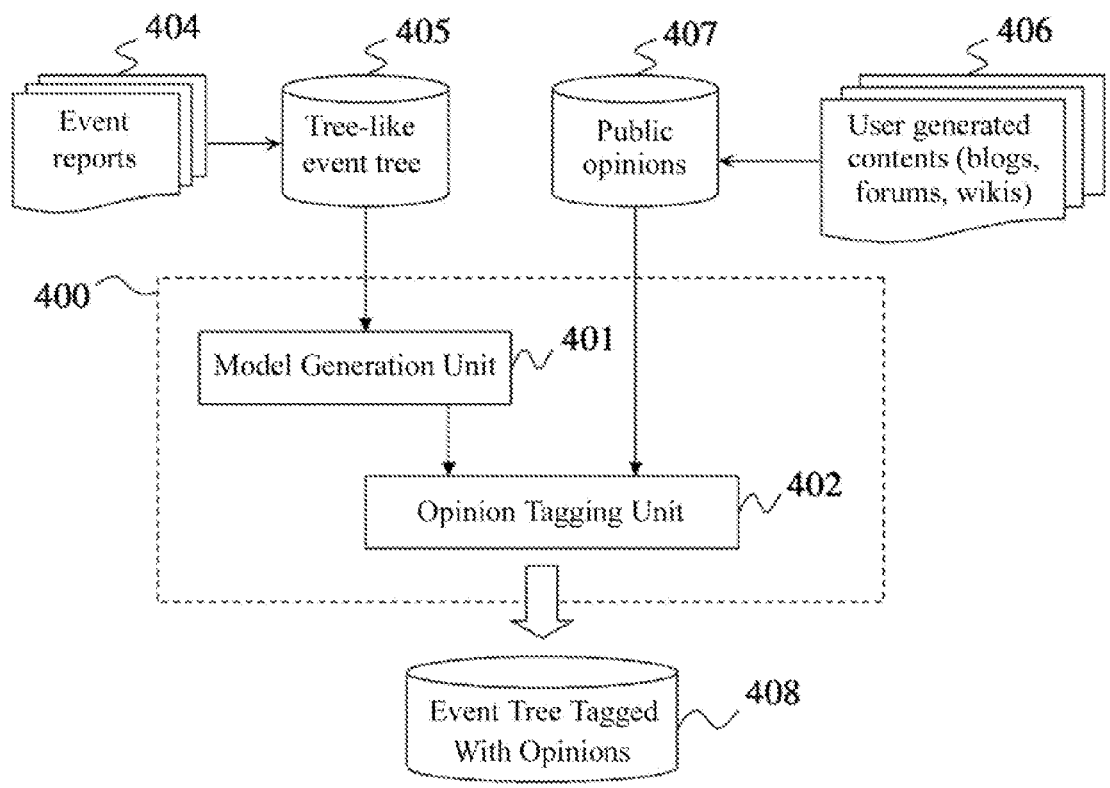
FIG. 4 is a structural diagram of an embodiment of a tracking tagging apparatus for tagging the public opinion data to the corresponding nodes of the event tree according to the present disclosure.

FIG. 4 is a structural diagram showing a tracking tagging apparatus for tagging public opinion data to the corresponding nodes of the event tree according to an embodiment of the present disclosure.

As shown in FIG. 4, a tracking tagging apparatus 400 according to the disclosure includes a model generation unit 401 and an opinion tagging unit 402. In addition, a memory 405 for storing the data of the event tree, a memory 407 for storing the massive public opinion data and a memory 408 for storing the data of the event tree tagged with the public opinions may be provided. The memories 405, 407 and 408 may be located either outside or inside of the tracking tagging apparatus 400. The memories 405, 407 and 408 may also be implemented as the same memory in which the data of the event tree, the public opinion data, and the data of the event tree tagged with the public opinions may be stored into different databases of the same memory, respectively.

The model generation unit 401 is coupled to the opinion tagging unit 402 and outputs information to the opinion tagging unit 402. The model generation unit 401 is also coupled to the memory 405 for storing the data of the event tree, and receives the data outputted from the event tree. The opinion tagging unit 402 is coupled to the memory 407 for storing the public opinion data, and receives the public opinion data outputted therefrom. The opinion tagging unit 402 is coupled to the memory 408 for storing the data of the event tree tagged with the public opinions, and outputs the data of the event tree tagged with the massive public opinions to the memory 408.

Other units or means necessary for operation may also be included in the structure of the tracking tagging apparatus 400, but the specific structures of the other units or means included are not limitation of the scope of the disclosure. For example, a data processing unit or a control unit may also be included in the tracking tagging apparatus 400. Also, the model generation unit 401 together with the opinion tagging unit 402 may be implemented as the same unit.

According to one aspect of the disclosure, the data of the event tree generated from the event report 404 of the media are stored into the memory 405, and the model generation unit 401 generates classification models for the respective nodes in the event tree (the structured data set) which is based on the event issued by the media in accordance with the data of the event tree stored in the memory 405, and outputs the generated classification models to the opinion tagging unit 402. The massive public opinion data extracted from the user-generated contents 406 are stored into the memory 407. The opinion tagging unit 402, in accordance with the generated classification models as well as the public opinion data stored in the memory 407, tags the opinions delivered by the public regarding the above event to the corresponding nodes of the event tree to form the event tree tagged with the public opinions, and stores the data of the event tree tagged with the massive public opinions into the memory 408. That is, the model generation unit 401 creates the classification models for the respective nodes of the structured data set based on the structured data set of the event, while the opinion tagging unit 402 acquires the public opinions on the event stored in the memory 407, and tags the opinions to the corresponding nodes in the structured data set by using the generated classification models. The specific way of tagging the opinions to the corresponding nodes in the structured data set by using the generated classification models may be that, for example, the data for the opinion are substituted into the classification models for nodes, the similarity between the opinion and the respective nodes in the structured data set is calculated, and the opinion is tagged to the node with the maximal similarity.

Figure 5:
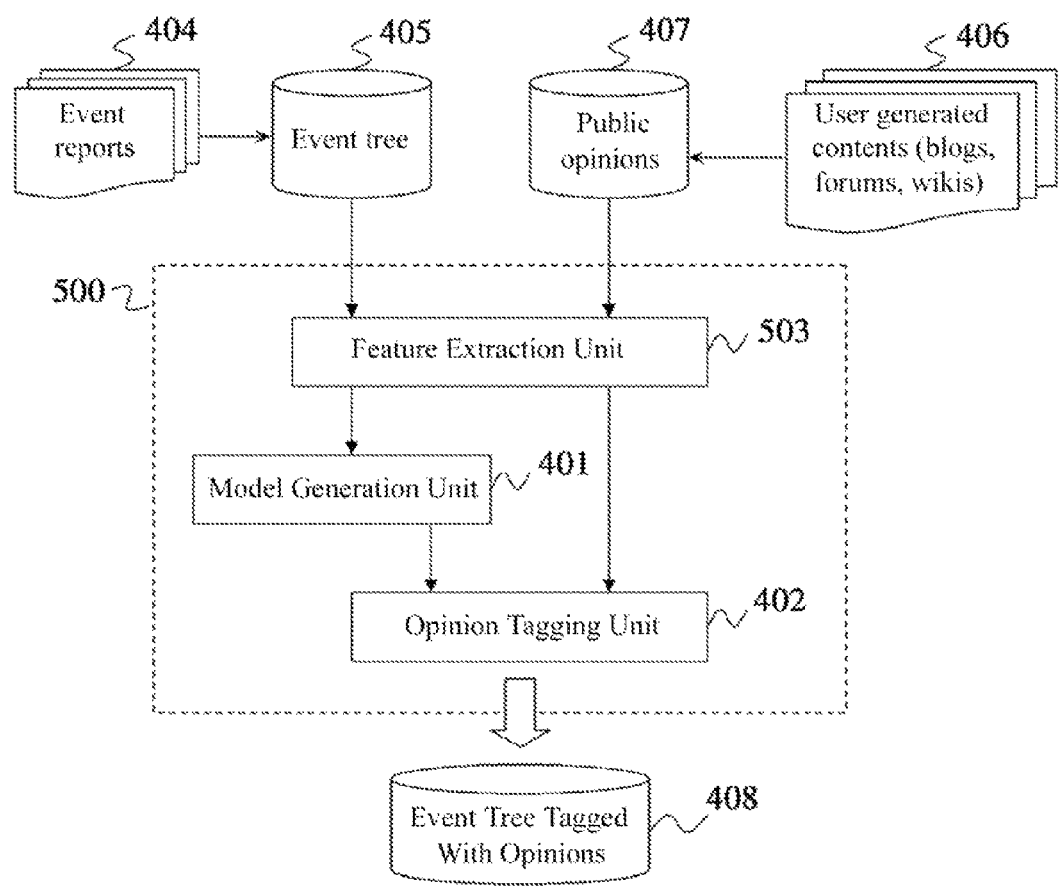
FIG. 5 is a structural diagram for another embodiment of a tracking tagging apparatus for tagging the public opinion data to the corresponding nodes of the event tree according to the present disclosure.

FIG. 5 is a structural diagram for a tracking tagging apparatus for tagging the public opinion data to the corresponding nodes of the event tree according to another embodiment of the present disclosure.

As shown in FIG. 5, a tracking tagging apparatus 500 according to the disclosure includes a model generation unit 401, an opinion tagging unit 402 and a feature extraction unit 503. In addition, a memory 405 for storing the data of the event tree, a memory 407 for storing the public opinion data and a memory 408 for storing the data of the event tree tagged with the public opinions may be provided. The memories 405, 407 and 408 may be located either outside or inside of the tracking tagging apparatus 500. The memories 405, 407 and 408 may also be implemented as the same memory in which the data of the event tree, the public opinion data, and the data of the event tree tagged with the public opinions may be stored into different databases of the same memory, respectively.

The model generation unit 401 is coupled to the opinion tagging unit 402, and outputs information to the opinion tagging unit 402. The feature extraction unit 503 is coupled to the model generation unit 401 and opinion tagging unit 402 respectively, and outputs information to the same. The feature extraction unit 503 is coupled to the memory 405 for storing the data for the event tree, and receives the data for the event tree outputted therefrom. Meanwhile, the feature extraction unit 503 is also coupled to the memory 407 for storing the public opinion data, and receives the massive public opinion data outputted therefrom. The opinion tagging unit 402 is coupled to the memory 408 for storing the data of the event tree tagged with the public opinions, and outputs the data of the event tree tagged with the massive public opinions to the memory 408.

Other units or means necessary for operation may also be included in the structure of the tracking tagging apparatus 500, but the specific structures of the other units or means included do not limit the scope of the disclosure. For example, a data processing unit or a control unit may also be included in the tracking tagging apparatus 500. Also, the model generation unit 401, the opinion tagging unit 402, and the feature extraction unit 503 may be implemented as the same unit or incorporated with each other into new units.

According to one aspect of the disclosure, an event tree generated from the event report 404 of the media is stored in the memory 405. The feature extraction unit 503 receives the data for the event tree outputted from the memory 405, and extracts the feature information from the respective nodes of the event tree. Specifically, the feature extraction unit 503 first selects the root node of the event tree, extracts the feature information for at least one of the features such as the content feature, time feature, sentiment feature, etc. from the root node as well as the respective lower level nodes of the root node, and outputs the extracted feature information to the model generation unit 401. The content feature refers to phrases and fields in headlines and articles and so on, the time feature refers to publication time of the articles, and the sentiment feature refers to judging a sentiment trend (positive, negative, etc.) and degree (slight, moderate, severe, etc.) expressed by text by using a sentiment classifier to use the generated sentiment value as classification feature.

Then, the feature extraction unit 503 selects a subordinate level node of the root node, extracts the feature information for at least one of the features such as content feature, time feature, sentiment feature, etc. from the subordinate level node as well as the respective lower level nodes of the subordinate level node, and outputs the extracted feature information for the subordinate level nodes to the model generation unit 401. The above operation for extracting the feature information is performed repeatedly for each node of the event tree until the extraction of the feature information is completed for all the nodes.

The model generation unit 401 correspondingly generates the classification models for each node of the event tree in accordance with the extracted feature information for each node, and outputs the generated classification models to the opinion tagging unit 402. The method for generating the classification models for the respective nodes may for example employ Generic Supervised Machine Learning Algorithm such as Support Vector Machine Model, Native Bayes Classification Model, etc. Specifically, after determining a specific form of classification model function, it is possible to use the data (for example the above feature information) contained in each node to learn the parameters of the model so as to create the classification model. The above algorithm for generating the classification model does not limit the scope of the disclosure. Those skilled in the art may employ any suitable algorithm to achieve the creation of the classification model.

The massive public opinion data searched out from the user-generated contents 406 (for example opinions, comments, etc. delivered on blogs, forums, wikis or other non-network media, etc.) are stored in the memory 407. The method for searching for the public opinions may be that, for example, the comments and opinions concerned with the event are extracted by the text analyzing technique, and the comments and opinions are analyzed. The text analyzing technique may for example employ the method of "comparison of similarity for information segments", that is, comparing the similarity between information segments in the public opinions or comments to be searched for and the predetermined information segments (for example sentence, keyword, video segment, audio segment, etc.), and extracting the public opinions or comments as the public opinions or comments to be selected if the similarity is larger than or equal to a certain threshold. The above method for searching for and obtaining the required public opinions does not limit the scope of the disclosure, and those skilled in the art may employ any suitable method to achieve the search of the public opinions.

The feature extraction unit 503 receives the public opinion data outputted from the memory 407, and extracts the corresponding feature information, which for example may be at least one of the content feature, time feature, sentiment feature, etc., from the data for each one of the received massive public opinions, and outputs the extracted feature information to the opinion tagging unit 402. The content feature refers to phrases and fields in headlines and articles and so on, the time feature refers to publication time of article, and the sentiment feature refers to judging a sentiment trend (positive, negative, etc.) and degree (slight, moderate, severe, etc.) expressed by the text by using a sentiment classifier to use the generated sentiment value as the classification feature.

The opinion tagging unit 402, based on the above created classification model as well as the feature information extracted from the public opinions, tags the respective opinions of the massive public opinions to the corresponding nodes of the event tree so as to form the event tree tagged with the public opinions, and stores the data for the event trees tagged with the massive public opinions into the memory 408.

Thus, another embodiment of the tracking tagging apparatus based on the structured data set (the event tree) according to the disclosure includes: the feature extraction unit 503 which selects the feature information from a node (it is possible to be set to start from the root node for example) and all its lower level nodes of the structured data set (the event tree) created based on the event issued by the media, provides the extracted feature information to the model generation unit 401, and also extracts the feature information of the searched public opinions, and outputs the same to the opinion tagging unit 402; the model generation unit 401 which creates the classification models for the respective nodes of the structured data set in accordance with the feature information for the respective nodes received from the feature extraction unit 503; and the opinion tagging unit 402 which tags the respective public opinions to the most matched nodes of the structured data set by means of the generated classification models as well as the extracted feature information of the public opinions. Specifically, the opinion tagging unit 402 compares the similarity between the public opinions and the respective nodes of the structured data set, and tags the opinions to the nodes with the maximal similarity.

More specifically, the opinion tagging unit 402 inputs the feature information of the opinion into the classification model for a current node, and outputs a classification result which exhibits the similarity between the opinion and the current node in form of numerical values from the classification model. If the similarity of the current node is larger than a predetermined threshold, the current node is recorded in for example a memory, and the predetermined threshold is rewritten to the value of the similarity, and if the current node further has a subordinate level node, the comparison of the similarity between the public opinion and the subordinate level node of the current node is continued. If the similarity of the current node is not larger than the predetermined threshold, or the current node has no subordinate level node, the public opinion is tagged to the node with the maximal similarity. If the current node has several subordinate level nodes, the subordinate level nodes are respectively compared with the public opinion, and the node with the maximal similarity is set as a new current node.

Figure 6:
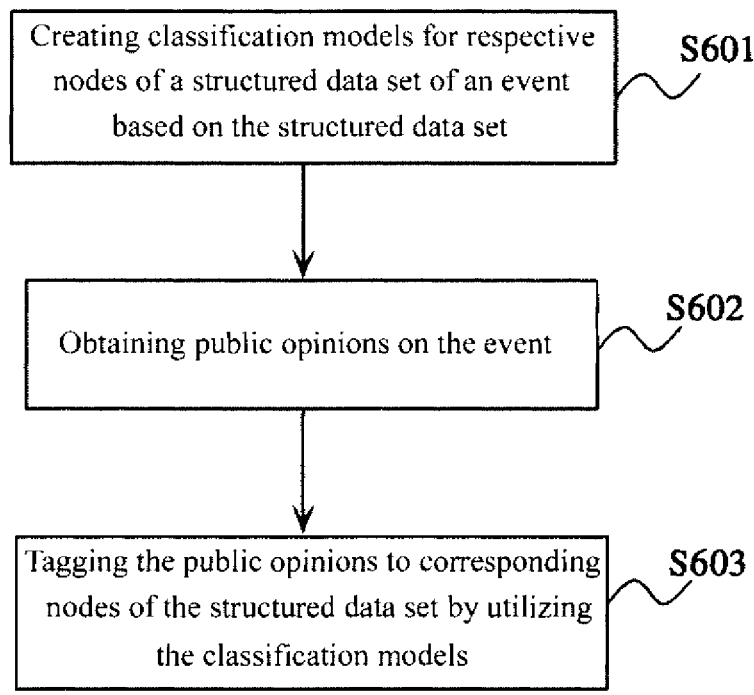
FIG. 6 is a flowchart of a tracking tagging method according to one embodiment of the present disclosure.

FIG. 6 is a flowchart of the tracking tagging method according to one embodiment of the present disclosure.

As shown in FIG. 6, at step S601, the classification models for the respective nodes of the structured data set for the event issued by the media are created based on for example the structured data set. At step S602, the opinions delivered by the public regarding the above event are obtained. At step S603, the above opinions delivered by the public are tagged to the corresponding nodes of the structured data set by using the generated classification models.

The above step S601 can be performed by the model generation unit 401, and the above step S603 can be performed by the opinion tagging unit 402.

Figure 7:
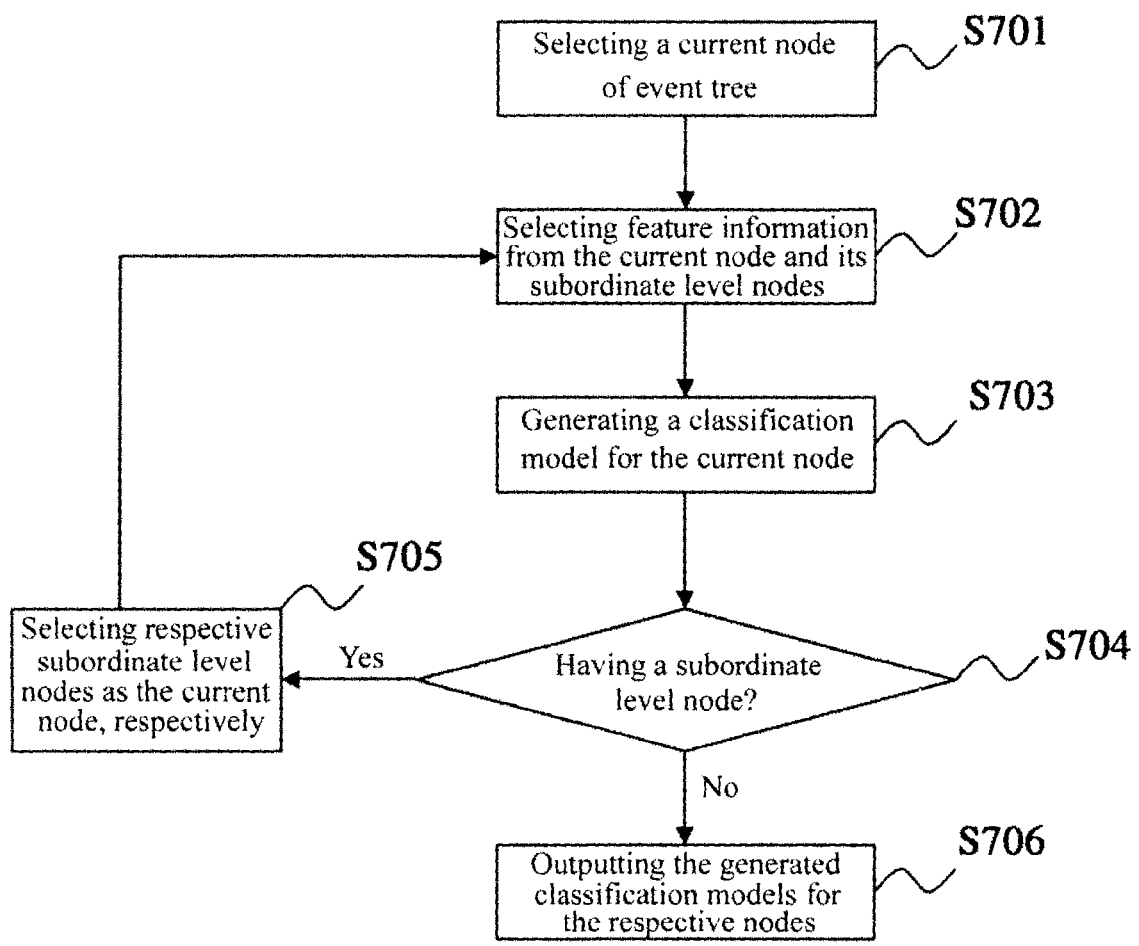
FIG. 7 is a flowchart of a tracking tagging method according to another embodiment of the present disclosure.

FIG. 7 is a flowchart of the tracking tagging method according to another embodiment of the present disclosure.

FIG. 7 shows a flowchart for further operation of the step S601 in FIG. 6. As shown in FIG. 7, at step S701, the current node of the event tree is selected. According to an embodiment of the disclosure, the current node may be the root node of the event tree (the structured data set). At step S702, the feature information is selected from the current node and its respective lower level nodes of the event tree. Herein, the feature information may be at least one of the content feature, time feature, sentiment feature, etc. as described above. At step S703, the classification model for the current node is generated in accordance with the feature information for the respective nodes selected in step S702. At step S704, it is judged whether the current node has subordinate level nodes or not. If the current node has subordinate level nodes, the procedure proceeds to step S705. At step S705, the respective subordinate level nodes are selected as the current node, and steps S702 to S704 are repeated so as to generate the classification models for the respective nodes of the event tree. If it is determined that the current node has no subordinate level node at step S704, the procedure proceeds to step S706. At step S706, the generated classification models for the respective nodes are outputted.

The above step S702 can be performed by the feature extraction unit 503, and the above steps S703 to S706 can be performed by the model generation unit 401. The above step S701 may also be performed by either the feature extraction unit 503 or the model generation unit 401.

Figure 8:
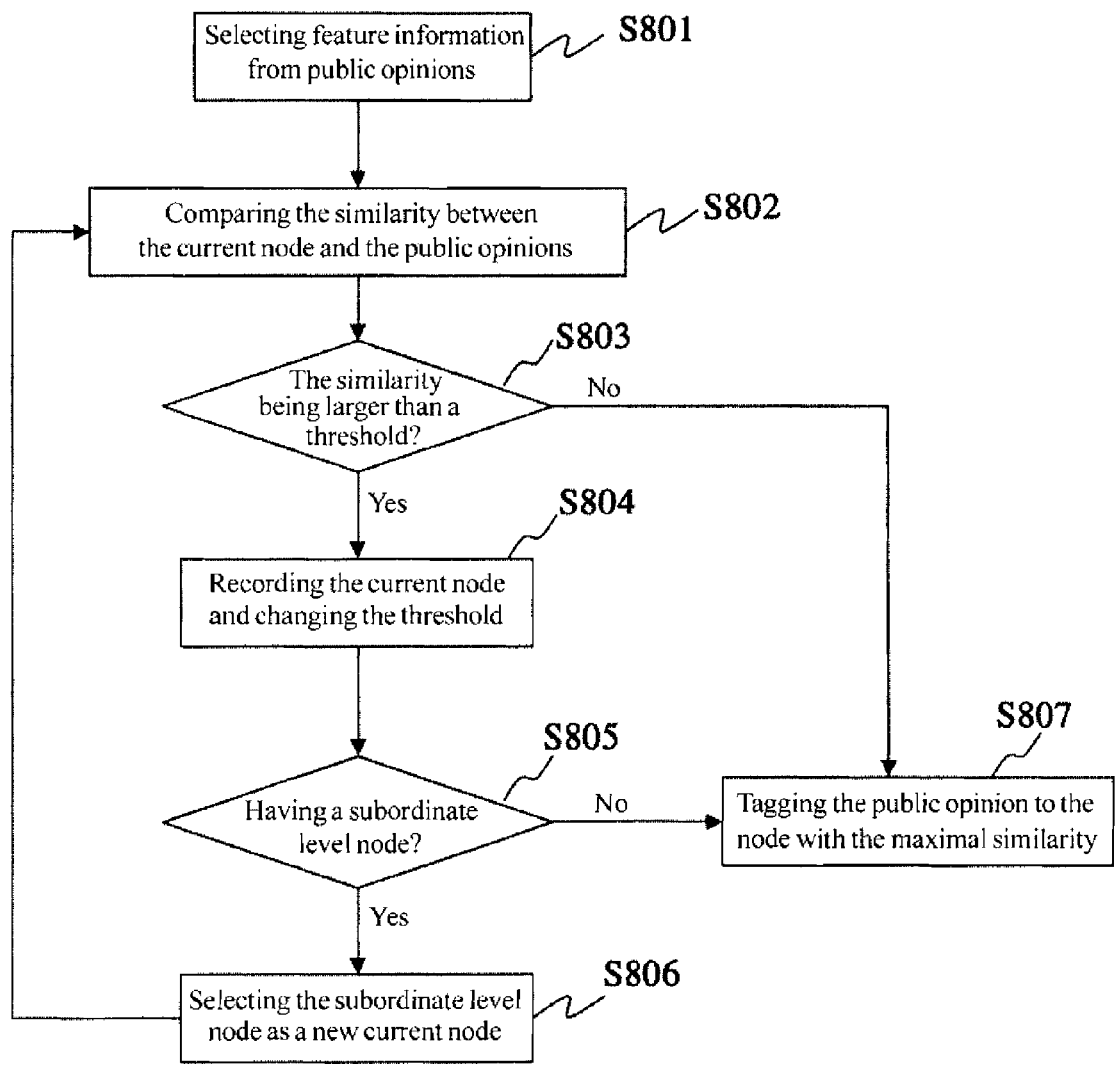
FIG. 8 is a flowchart of a tracking tagging method according to still another embodiment of the present disclosure.

FIG. 8 is a flowchart of the tracking tagging method according to still another embodiment of the present disclosure.

FIG. 8 shows a flowchart for further operation of the step S604 in FIG. 6. As shown in FIG. 8, at step S801, the feature information is extracted from each one of the massive public opinions. Herein, the feature information may be at least one of the content feature, time feature, sentiment feature, etc. as described above. At step S802, a current node is selected from the event tree (it is possible to start from the root node), and the classification model of the current node is used to compare the similarity between the public opinion to be matched and the current node. Specifically, the feature information for the public opinion is input into the classification model for the current node, and a classification result is output which exhibits the matching degree, which can be referred to as "similarity" herein, between the public opinion and the current node in form of numerical values. At step S803, it is determined whether the similarity between the current node and the public opinion is larger than a predetermined threshold or not. In response to determining that the similarity between the current node and the public opinion is larger than the predetermined threshold, the procedure proceeds to step S804. Otherwise, if the similarity between the current node and the public opinion is not larger than the predetermined threshold, the procedure skips step S804 and directly proceeds to step S807, that is, the node with the maximal similarity is outputted as the finally matched node, and the public opinion is tagged to the finally matched node. The design of the predetermined threshold is to control the process of recursively matching to stop at a certain middle node, that is, the public opinion is matched with a certain class of the general event rather than some particular events, which is useful in the actual applications. The predetermined threshold may be set according to the specific requirements of the users, and the value thereof does not limit the scope of the disclosure.

At step S804, the current node is recorded, and the predetermined threshold is rewritten to the value of the similarity. At step S805, it is determined whether the current node has a subordinate level node or not. If the current node has a subordinate level node, the procedure proceeds to step S806. At step S806, the subordinate level node is set as a new current node, and the steps S802 to S805 are repeated to find out the node with the maximal similarity. If the number of the subordinate level nodes at step S806 is larger than one, first the subordinate level nodes may be compared with the public opinion respectively, and the node with the maximal similarity is set as the new current node, then the steps S802 to S805 are repeated.

If it is determined that the current node has no subordinate level node at step S805, the procedure proceeds to step S807. At step S807, the node with the maximal similarity is outputted as the finally matched node, and the public opinion is tagged to the finally matched node.

According to one aspect of the disclosure, an event tree is traversed for each public opinion, i.e. starting from the root node of the event tree, and the similarity between the public opinion and the respective nodes of the event tree is compared so as to find out the node with the maximal similarity. The root node of the event tree is set as the current node when starting comparison.

The above step S801 can be performed by the feature extraction unit 503, and the above steps S802 to S807 can be performed by the opinion tagging unit 402.

The order of performing the steps of the above respective embodiments according to the disclosure does not limit the scope of the disclosure. Thus, the steps of the tracking tagging method according to the disclosure can also be described as follows: comparing the similarity between the public opinion and the respective nodes of the structured data set (steps S802-S806); and tagging the opinion to the node with the maximal similarity (step S801). Wherein, it includes steps of: extracting the feature information of the public opinion (step S801); and inputting the feature information of the public opinion into the classification model for a current node, and outputting the classification result which exhibits the similarity between the opinion and the current node in form of numerical value (step S802). Wherein, it includes the steps of: recording the current node, and rewriting the predetermined threshold to the value of the similarity, if the similarity is larger than the predetermined threshold (steps S803-S804), and continuing to compare the similarity between the public opinion and the subordinate level nodes of the current node, if the current node has subordinate level nodes (steps S806, S802-S805). Wherein, it includes steps of: tagging the opinion to the node with the maximal similarity, if the similarity is no larger than the predetermined threshold, or the current node has no a subordinate level node (step S807). Wherein, it includes the steps of: comparing several subordinate level nodes with the public opinion respectively, and setting the node with the maximal similarity as the new current node, if the current node has the plurality of subordinate level nodes (step S806).

By the above respective embodiments of the disclosure, the public opinions can by automatically and accurately tagged to official reports for the event by the network media, users can be provided with the well-ordered, focused public opinions with respect to each event, and the evolution of the public opinions along with time can be expressed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above various embodiments of the disclosure are only illustrative description, and the specific structures and operations thereof do not limit the scope of the disclosure. Those skilled in the art can combine different parts and operations of the above various embodiments to produce new embodiments which also accord with the concept of the disclosure.

Although some embodiments of the present disclosure have already been described in combination with the attached drawings as above, it should be appreciated by those skilled in the art that variations and modifications which are still within the scope of the claims and their equivalents of the present disclosure can be made without departing from the principle and spirit of the disclosure.

What is claimed is:

1. A tagging method based on a structured data set, comprising:
    receiving a reported real-life news event from an official source;
    extracting the structured data set from the received reported news event;
    creating an event tree representing the extracted structured data set of the reported real-life news event, the event tree including a plurality of nodes, wherein each node represents a different feature of the reported news event;
    creating a plurality of classification models for each node in the event tree;
    acquiring public opinions on the reported news event by searching the World Wide Web for user-generated contents including the public opinions; and
    tagging the acquired public opinions to corresponding nodes of the event tree using the plurality of created classification models, wherein the tagging comprises:
        extracting feature information of a particular public opinion;
        inputting the feature information of the particular public opinion into the plurality of classification models of a current node;
        outputting a classification result which exhibits similarity level between the particular opinion and the current node in form of numerical value; and
        recording the current node, and replacing a predetermined threshold value of the similarity level with an outputted value of the similarity level, if the value of the outputted similarity level is larger than the predetermined threshold value.

2. The tagging method according to claim 1, wherein the creating the plurality of classification models for each node comprises:
    selecting feature information from a current node and its subordinate level nodes of the event tree; and
    generating a classification model for the current node in accordance with the feature information.

3. The tagging method according to claim 2, wherein the feature information includes at least one of content feature, time feature and sentiment feature.

4. The tagging method according to claim 1, wherein the tagging further comprises:
continuing to compare the similarity level between the particular public opinion and the subordinate level nodes of the current node, if the current node has subordinate level nodes.

5. The tagging method according to claim 4, wherein the tagging further comprises:
comparing the subordinate level nodes with the particular public opinion; and
setting a subordinate level node having a greatest similarity level as a new current node.

6. The tagging method according to claim 1, wherein the tagging further comprises:
tagging the particular public opinion to a node having a greatest similarity level, if the similarity level of the current node is not larger than the predetermined threshold or the current node has no subordinate level node.

7. The tagging method according to claim 1, wherein the current node is a root node of the event tree.

8. A tagging apparatus based on a structured data set, comprising:
a computer processor;
a computer memory containing instructions that are executable by the computer processor;
a model generation unit operable to, in response to receiving at least an instruction from the computer processor to:
receive a reported real-life news event from an official source;
extract the structured data set from the received reported news event;
create an event tree representing the extracted structured data set of the reported real-life news event, the event tree including a plurality of nodes, wherein each node represents a different feature of the reported news event,
create a plurality of classification models for each node in the event tree; and
an opinion tagging unit operable to, in response to receiving at least an instruction from the computer processor to:
acquire public opinions on the reported news event by searching the World Wide Web for user-generated contents including the public opinions, and
tag the acquired public opinions to corresponding nodes of the event tree by using the plurality of created classification models, wherein the tagging comprises:
extracting feature information of a particular public opinion;
inputting the feature information of the particular public opinion into the plurality of classification models of a current node;
outputting a classification result which exhibits similarity level between the particular opinion and the current node in form of numerical value; and
recording the current node, and replacing a predetermined threshold value of the similarity level with an outputted value of the similarity level, if the value of the outputted similarity level is larger than the predetermined threshold value.

9. The tagging apparatus according to claim 8, further comprising:
a feature extraction unit operable to, in response to receiving an instruction from the computer processor, extract feature information of the plurality of nodes and their subordinate level nodes in the event tree,
wherein the model generation unit is operable to create the plurality of classification models for each of the plurality of nodes based on the extracted feature information.

10. The tagging apparatus according to claim 8, wherein the opinion tagging unit is operable to continue to compare the similarity level between the particular public opinion and the subordinate level nodes of the current node, if the current node has subordinate level nodes.

11. The tagging apparatus according to claim 10, wherein if the current node has the subordinate level nodes, the opinion tagging unit is operable to compare the subordinate level nodes with the acquired public opinions, and to set a subordinate level node having a greatest similarity as a new current node.

12. The tagging apparatus according to claim 8, wherein the opinion tagging unit is operable to tag the particular public opinion to a node having a greatest similarity level if the similarity level of the current node is not larger than the predetermined threshold or the current node has no subordinate level node.

13. A computer program product for performing a tagging method based on a structured data set, the computer program product comprising a non-transitory computer-readable storage medium having computer readable program code embodied therewith, the computer readable program code comprising:
computer readable program instructions configured to receive a reported real-life news event from an official source;
computer readable program instructions configured to extract the structured data set from the received reported news event;
computer readable program instructions configured to create an event tree representing the extracted structured data set of the reported real-life news event, the event tree including a plurality of nodes, wherein each node represents a different feature of the reported news event;
computer readable program instructions configured to create a plurality of classification models for each node in the event tree;
computer readable program instructions configured to acquire public opinions on the reported news event by searching the World Wide Web for user-generated contents including the public opinions; and
computer readable program instructions configured to tag the acquired public opinions to corresponding nodes of the event tree using the plurality of created classification models, wherein the tagging comprises:
extracting feature information of a particular public opinion;
inputting the feature information of the particular public opinion into the plurality of classification models of a current node;
outputting a classification result which exhibits similarity level between the particular opinion and the current node in form of numerical value; and
recording the current node, and replacing a predetermined threshold value of the similarity level with an outputted value of the similarity level, if the value of the outputted similarity level is larger than the predetermined threshold value.

14. The computer program product according to claim 13, wherein the computer readable program code configured to create the plurality of classification models for each node in the event tree comprises:
   computer readable program instructions configured to select feature information from a current node and its subordinate level nodes of the event tree; and
   computer readable program instructions configured to generate a classification model for the current node in accordance with the feature information.

* * * * *